United States Patent Office 3,297,726
Patented Jan. 10, 1967

3,297,726
AROMATIC HINDERED ISOCYANATES
Wilfried Zecher and Hans Holtschmidt, Cologne-Stammheim, Germany, assignors to Farbenfabriken Bayer Aktiengesellschaft, Leverkusen, Germany, a corporation of Germany
No Drawing. Filed May 29, 1963, Ser. No. 284,020
Claims priority, application Germany, May 30, 1962, F 36,942
1 Claim. (Cl. 260—395)

The present invention relates to organic isocyanates and more particularly, to a process for the production thereof.

It has been known to prepare isocyanates from the reaction of primary amines with phosgene. However, if the amine which is used as a starting material contains groups that are reactive with phosgene, undesirable subsequent reactions occur. For example, during the phosgenating process, hydroxyl groups may be replaced by halogen atoms or converted into chlorofumaric or carboxylic acid esters or can even react with the isocyanate already formed to form urethanes. In some cases when compounds containing reactive groups are obtained, for example, isocyanato salicylic acid stabilized by the formation of a hydrogen bridge, these substances are unstable and polymerize after a short time.

It is an object of this invention to provide stable isocyanates which contain hydroxyl groups. It is another object of this invention to provide a process for the preparation of isocyanates containing hydroxyl groups.

The foregoing objects and others are accomplished in accordance with this invention, generally speaking, by providing isocyanates having hydroxyl groups in the same molecule by a process wherein phosgene is reacted with phenols having at least one amino group. These phenols are doubly hindered, that is, they are substituted in both ortho-positions with respect to the hydroxyl group by secondary alkyl radicals, tertiary alkyl radicals, cycloalkyl-radicals, aryl-radicals, carbalkoxy radicals, dialkylamido radicals, halogen atoms, or the cyano group. The radicals which hinder the hydroxy group can be the same or they can be different. Bulky alkyl radicals such as tertiary butyl or chlorine substituents are preferred.

Any doubly hindered phenol will be suitable for the process of the present invention such as, for example,

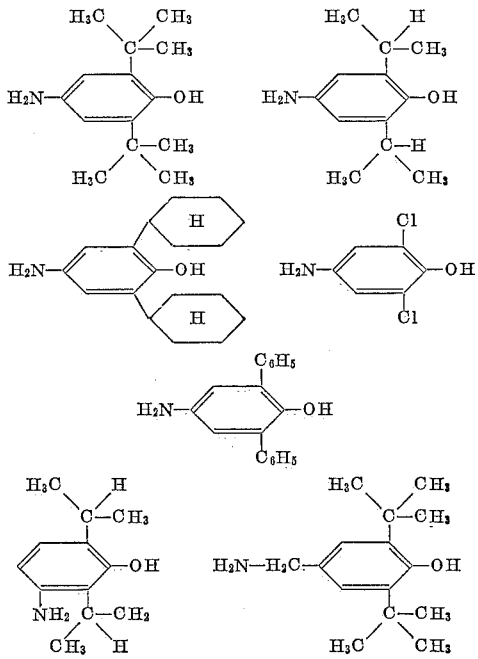

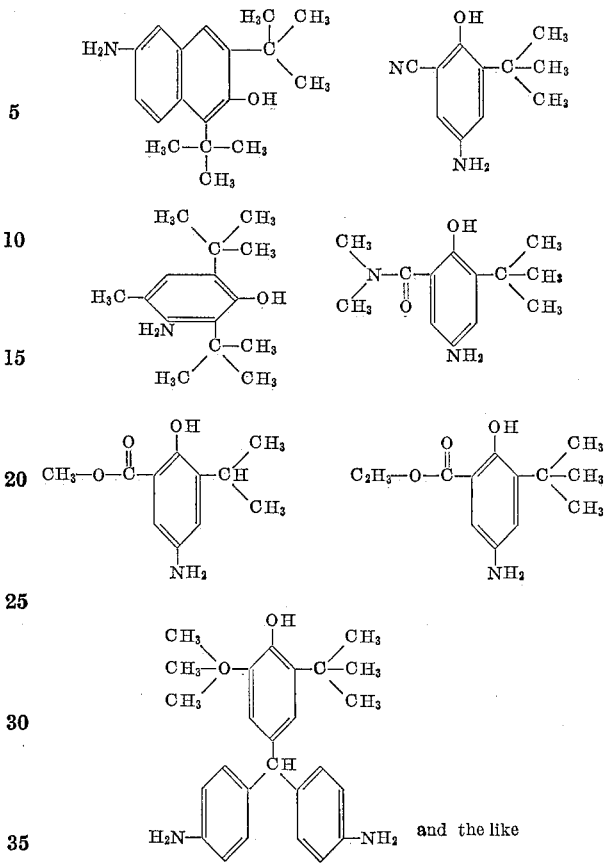

and the like

As can be seen by the preceding examples of phenols containing amino groups, the amino groups can be directly bound to the aromatic ring containing the hydroxyl group or they can be bound to the ring through aromatic or aliphatic radicals. Any suitable aliphatic radical may be used to join the amino group to the aromatic ring containing the hydroxyl group, such as, for example, methyl, ethyl, propyl, butyl, methylene, ethylene, propylene, butylene isobutylene and the like. Any suitable aromatic radical may be used to join the amino group to the aromatic ring containing the hydroxyl group such as, for example, aryl radicals, such as, for example, phenyl, α-naphthyl, β-naphthyl, α-anthryl, β-anthryl, gamma-anthryl including the various monovalent radicals of indene, isoindene, acenaphthene, fluorene, phenanthrene, naphthacene, chrysene, pyrene, triphenylene and the like.

Any suitable secondary alkyl radical can be the substituent in the ortho-position to the hydroxyl group such as, for example, those having from about 3 to about 18 carbon atoms such as, for example, sec-butyl, sec-pentyl, sec-hexyl, sec-heptyl, sec-octyl, sec-nonyl, sec-decyl and the like along with the isomeric mixtures thereof.

Any suitable tertiary alkyl radical can be the substituent in the ortho-position to the hydroxyl group such as, for example, those having from about 4 to about 18 carbon atoms such as, for example, t-butyl, t-pentyl, t-hexyl, t-heptyl, t-octyl, t-nonyl, t-decyl and the like along with the isomeric mixtures thereof.

Any suitable aryl radical may be the substituent in the ortho-position to the hydroxyl group, such as, for example, phenyl, α-naphthyl, β-naphthyl, α-anthryl, β-anthryl, gamma-anthryl including the various monovalent radicals of indene, isoindene, acenaphthene, fluorene, phenanthrene, naphthacene, chrysene, pyrene, triphenylene and the like.

Any suitable cycloalkyl-radical can be the substituent in the ortho-position to the hydroxyl group, such as, for example, cyclophentyl, cyclohexyl, cycloheptyl and the like.

Any suitable carbalkoxy-radical may be the substituent in the ortho-position to the hydroxyl group, such as, for example carbomethoxy, carbethoxy, carbopropoxy and the like.

Any suitable dialkyl-amido radical may be the substituent in the ortho-position to the hydroxyl group, such as, for example, dimethyl amido- diethyl amido, dipropyl amido, dibutyl amido and the like.

Any suitable halogen radical may be the substituent in the ortho-position to the hydroxyl group, such as, for example, chlorine, bromine, fluorine and iodine.

The substituent in the ortho-position to the hydroxyl group can also be the cyano group (—C≡N).

The amines employed as a starting material in practicing the present invention may be obtained for example, by the reduction of the corresponding nitro- or nitroso- compound in the presence of a strong reducing agent such as hydrogen.

Phosgenation of the phenols which contain the amino groups is carried out in known manner by the usual technical methods of phosgenation for the isocyanate can be readily prepared from the amines, corresponding to the isocyanate desired, by treatment with phosgene. Due to the tendency of amines to form ureas on reaction with phosgene, especially at the temperatures used for the production of the isocyanates, the usual methods for producing isocyanates from the corresponding amines are as follows: a salt of the amine with a volatile acid, e.g., the carbonate or the hydrochloride of the amine, corresponding to the isocyanate desired, is first prepared and this salt is then reacted with phosgene to form the isocyanate, or, alternatively, the free amine may first be treated with phosgene—at a low temperature—to form an intermediate reaction product, which is believed to be a mixture of carbamyl chloride and hydrochloride (a temperature range of from −15 to +10° and up to 80° is preferred); and this intermediate reaction product is then subjected to further treatment with phosgene, preferably at an elevated temperature (temperatures of from 90° C. up to 160° C. are preferred), in order to produce the desired isocyanate. The phosgenation reaction can be carried out intermittently or continuously and is advantageously effected in the presence of an inert solvent. Any suitable solvent can be used, such as, for example, benzene, chlorobenzene, dichlorobenzene, toluene, xylene, nitrobenzene, cyclohexane, kerosene, carbontetrachloride, tetrachlorethylene, trichlorethylene, trichlorbenzene, decahydronaphthalene, tetrahydronaphthalene, amylbenzene, ortho-, meta-, and paracymenes, dodecylbenzene, naphthalene, diphenyl, partially hydrogenated aromatic hydrocarbons boiling above 340° C., dialkyl ethers of mono-, di-, or trialkylene glycols, such as, for example, dialkyl ethers of ethylene glycol, dialkyl ethers of diethylene glycol, dialkyl ethers of triethylene glycol, dialkyl ethers of propylene glycol, dialkyl ethers of dipropylene glycol, 2-ethylhexane-1,3-dialkyl ether, pentanediol-2,4-dialkyl-ether, dialkyl ethers of hexylene glycol and the like. The alkyl portion of these solvents can be any suitable alkyl radical having from one to five carbon atoms.

The isocyanates obtained by phosgenation of amines in accordance with the present invention will produce an isocyanate whose structure will correspond to that of the amine with the exception that the amino group will now be an —NCO group.

Owing to their peculiar nature, the isocyanates which contain hydroxyl groups and which may be prepared by the process of the present invention can be used as intermediate products for the preparation of insecticides, herbicides, dyestuffs, pharmaceuticals, age resisting agents, synthetic materials such as, for example, the reaction with an organic compound containing active hydrogen atoms to produce all types of polyurethane plastics and the like.

The invention is further illustrated by the following examples in which the parts are by weight unless otherwise specified.

Example 1

About 350 parts (about 3.5 mols) of phosgene is dissolved in about 800 parts (cc.) chlorobenzene cooled with a mixture of ice and salt. While the temperature is kept at about 0° C. by cooling continuously, the solution of about 221 parts (about 1 mol) of 2,6-di-tertiary-butyl-4-amino-phenol in about 800 parts of chlorobenzene is slowly added drop by drop. While phosgene is passed over the reaction mixture, the latter is gradually heated to about 100° C. and then kept for about another three hours at this temperature. Hydrogen chloride and excess phosgene is then blown out with nitrogen for about one hour, and the mixture is filtered and the solvent is distilled off in a vacuum. The residue is fractionated under a high vacuum. The isocyanate, which has a boiling point at about 0.2 mm. Hg of about 111–116° C. is obtained as a pale pink product which solidifies in the vessel. Recrystallization from a small quantity of light petrol yields polyhedral crystals, having a melting point of about 63–65° C. Analysis indicated that the isocyanate prepared had a molecular weight of about 247.4 and a structural formula of $C_{15}H_{21}NO_2$.

Calculated: C=72.87%; H=8.56%; N=5.66%.
Found: C=72.54%, 72.38%; H=8.54%, 8.44%; N=5.74%, 5.76%.

The isocyanate can be reacted with steryl alcohol to give the corresponding urethane which is useful as an age resisting agent for compounding of natural rubber.

Example 2

A suspension of 89 parts of 2,6-dichloro-4-amino phenol in 250 parts of chloro benzene are added drop by drop at 0° C. into the solution of 220 parts of phosgene in 400 parts of chloro benzene. While phosgene is paste over the reaction mixture, the latter is gradually heated to 110 to 120° C. and then kept for about another four hours at this temperature. Hydrogen chloride and excess phosgene is then blown out with nitrogen and the reaction mixture is fractionated in vacuo. 3,5-dichloro-4-hydroxyphenyl isocyanate having a boiling point of 0.25 mm. Hg at 109 to 111° C. is obtained as a colorless liquid which solidifies in the vessel. Recrystallisation from a small quantity of light petrol yields colorless needles having a melting point of 76 to 78° C. Analysis indicated that the isocyanate prepared has a molecular weight of about 204.02 and a structural formula of $C_{15}H_{21}NO_2$.

The isocyanate can be reacted with stearyl alcohol to give the corresponding urethane which is useful as an age resisting agent for compounding of natural rubber.

It is to be understood that any suitable phenol having at least one amino group, the hydroxyl group of which is hindered in each ortho-position and the like described herein can be substituted for the particular ones employed in the preceding examples with satisfactory results providing the teachings of the preceding disclosure are followed.

Although the invention has been described in considerable detail in the foregoing for the purpose of illustration, it is to be understood that such detail is solely for this purpose and that variations can be made therein by those skilled in the art without departing from the spirit and scope of the invention except as set forth in the claim.

What is claimed is:

An aromatic isocyanate having phenolic hydroxyl groups, said phenolic hydroxyl groups being hindered in each ortho position thereto by a member selected from the group consisting of a secondary alkyl, tertiary alkyl, cycloalkyl, aryl, carbalkoxy, dialkyl carboxamido, halogen, and the cyano group.

References Cited by the Examiner

UNITED STATES PATENTS

| | | | |
|---|---|---|---|
| 2,428,843 | 10/1947 | Georges et al. | 260—453 |
| 2,894,993 | 7/1959 | Schmerling | 260—619 |
| 3,180,883 | 4/1965 | Case | 260—453 |

FOREIGN PATENTS 610,652  12/1960  Canada.

OTHER REFERENCES

Marchlewski et al., 1935 vol. 29, p. 1010.

CHARLES B. PARKER, *Primary Examiner.*

D. R. MAHANAND, *Assistant Examiner.*